US008296741B1

(12) United States Patent
Huang et al.

(10) Patent No.: US 8,296,741 B1
(45) Date of Patent: Oct. 23, 2012

(54) IDENTIFYING FUNCTION-LEVEL CODE DEPENDENCY BY SIMULATING RUNTIME BINDING

(75) Inventors: Andrew Huang, Menlo Park, CA (US); Hong Yan, Pittsburg, PA (US)

(73) Assignee: Google Inc., Mountain View, CA (US)

( * ) Notice: Subject to any disclaimer, the term of this patent is extended or adjusted under 35 U.S.C. 154(b) by 1301 days.

(21) Appl. No.: 11/681,905

(22) Filed: Mar. 5, 2007

(51) Int. Cl.
*G06F 9/44* (2006.01)

(52) U.S. Cl. ........................................ 717/135
(58) Field of Classification Search .................... 717/135
See application file for complete search history.

(56) References Cited

U.S. PATENT DOCUMENTS

| | | | | |
|---|---|---|---|---|
| 5,822,749 A | * | 10/1998 | Agarwal | 1/1 |
| 5,940,619 A | | 8/1999 | Abadi et al. | |
| 6,003,025 A | * | 12/1999 | Prager | 1/1 |
| 6,012,149 A | * | 1/2000 | Stavran | 714/2 |
| 6,031,623 A | * | 2/2000 | Smith et al. | 358/1.14 |
| 6,076,090 A | * | 6/2000 | Burroughs et al. | 707/792 |
| 6,122,638 A | * | 9/2000 | Huber et al. | 1/1 |
| 6,192,363 B1 | * | 2/2001 | Yasumura | 709/218 |
| 6,240,549 B1 | * | 5/2001 | Hamada et al. | 717/130 |
| 6,480,847 B1 | * | 11/2002 | Linenbach et al. | 707/600 |
| 6,487,713 B1 | * | 11/2002 | Cohen et al. | 717/105 |
| 6,804,686 B1 | * | 10/2004 | Stone et al. | 1/1 |
| 6,856,313 B2 | * | 2/2005 | Gossweiler et al. | 345/419 |
| 6,873,978 B1 | * | 3/2005 | Boucher et al. | 705/401 |
| 7,246,361 B1 | * | 7/2007 | Scalora et al. | 719/332 |
| 7,316,010 B1 | * | 1/2008 | Daynes et al. | 717/140 |
| 7,409,679 B2 | * | 8/2008 | Chedgey et al. | 717/144 |
| 7,707,557 B1 | * | 4/2010 | Nikolov | 717/130 |
| 2003/0121031 A1 | * | 6/2003 | Fraenkel et al. | 717/166 |
| 2003/0139917 A1 | * | 7/2003 | Hardwick et al. | 703/21 |
| 2003/0236986 A1 | * | 12/2003 | Cronce et al. | 713/189 |
| 2004/0044990 A1 | * | 3/2004 | Schloegel et al. | 717/113 |
| 2004/0064300 A1 | * | 4/2004 | Mathiske et al. | 703/22 |
| 2004/0141013 A1 | * | 7/2004 | Alcazar et al. | 345/847 |
| 2004/0158819 A1 | * | 8/2004 | Cuomo et al. | 717/128 |
| 2005/0021533 A1 | * | 1/2005 | Ayachitula et al. | 707/100 |
| 2005/0096861 A1 | * | 5/2005 | Ur et al. | 702/109 |
| 2005/0125776 A1 | * | 6/2005 | Kothari et al. | 717/131 |
| 2006/0107255 A1 | * | 5/2006 | Chagoly et al. | 717/127 |

(Continued)

OTHER PUBLICATIONS

Varhol, P., "Code-Dependency Analysis," Redmond Developer, Nov. 2007, [online] [Retrieved on Feb. 21, 2008] <URL:http://red-devnews.com/columns/articles.aspx?editorialsid=2319>.

(Continued)

*Primary Examiner* — Emerson Puente
*Assistant Examiner* — Hiren Patel
(74) *Attorney, Agent, or Firm* — Fenwick & West LLP

(57) ABSTRACT

An analysis tool analyzes a software system by simulating runtime binding in order to identify function-level code dependencies. The tool receives a list of one or more entry point functions and identifies other functions that can be invoked if the entry point functions are executed. The tool generates a tracker graph having tracker nodes representing classes that can be instantiated from the entry points. Each tracker node identifies functions/methods in that class that can be invoked from the entry points. If the software system uses an object-relational mapping to a database, the tracker graph also identifies the portions of the database that can be accessed from the entry points. The tool can be used to partition the functionalities of the software system into core and non-core functionalities in order to support upgrading while maintaining high-availability.

15 Claims, 7 Drawing Sheets

U.S. PATENT DOCUMENTS

2006/0129838 A1* 6/2006 Chen et al. .................... 713/186
2007/0038988 A1* 2/2007 Das .............................. 717/157
2008/0104085 A1* 5/2008 Papoutsakis et al. ......... 707/100
2008/0127233 A1* 5/2008 Neil et al. .................... 719/330
2008/0134154 A1* 6/2008 Patel et al. ................... 717/139

OTHER PUBLICATIONS

"Dependency Analysis, DSM," Jet Brains, [online] [Retrieved on Feb. 21, 2008] <URL:http://www.jetbrains.com/idea/features/dependency_analysis.html>.

* cited by examiner

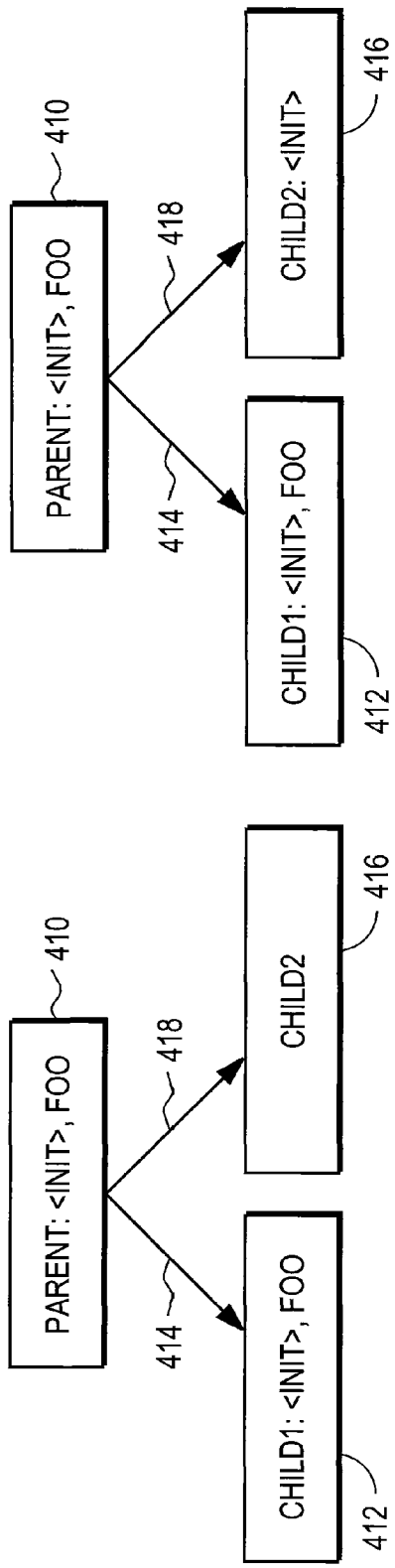
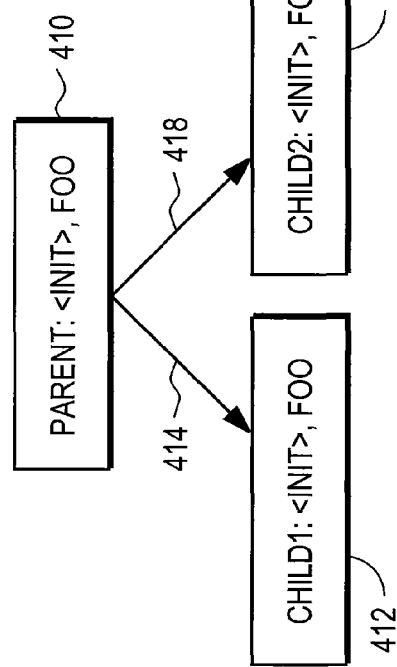

IDENTIFYING FUNCTION-LEVEL CODE DEPENDENCY BY SIMULATING RUNTIME BINDING

BACKGROUND OF THE INVENTION

1. Field of the Invention

This invention pertains to computer software development tools.

2. Description of the Related Art

Some complex software systems must execute with high availability. This requirement means that any downtime or other disruptions to the systems must be minimized. For example, it is desirable to make major electronic commerce websites highly-available because any downtime results in lost revenues. Nevertheless, developers in charge of websites and other such systems often need to alter the software in order to resolve bugs, introduce new functions, and/or otherwise improve it. Therefore, it is an ongoing challenge to alter complex software systems without significantly impacting the systems' availability.

One technique for updating a website or other software system requiring high-availability is to use multiple servers running different versions of the software. The software on one set of servers can be upgraded while the website is run from another set of servers. However, this technique is often difficult to implement. For example, consider a software system that frequently accesses database tables. Any updates to the database schema often result in downtime of the affected tables. Moreover, the changes to the schema might affect any version of the software, meaning that one cannot simply run a website using an old version of the software while changing the database. Similarly, some software and hardware systems are structured in ways that make it difficult or impossible to run different versions of the software on different servers. As a result, there are high costs associated with modifying high-availability software systems.

Another technique for modifying high-availability software systems is partitioning the functionalities of the software systems into different sets. One set of functions is left running, while the other set is brought down (i.e., disabled) for maintenance. For example, one can partition the software for a website into core and non-core functions. The non-core functions are brought down temporarily while they are modified. The core functions, in contrast, are modified using specialized techniques that support high-availability.

A problem with this latter technique is that complex software systems are often difficult to partition. Typically, it is easy to identify the entry-points functions that provide a particular function. However, it is difficult to identify other functions and/or database tables that are used by those entry-point functions. This problem is particularly acute for object-oriented programming languages that use late binding (runtime binding) techniques. With these languages, the actual function invoked by a call is not known until the system executes. Late binding thus makes it difficult to perform a static analysis (i.e., compile-time analysis) of the system to identify functions and/or database tables used by other functions. Class-level dependency tools can be used to analyze the system but such tools often produce an explosion of dependencies that include almost the entire code base. While it is possible to do a runtime analysis (i.e., code trace) of the software system using test input data, the test data might not cover all code branches and result in an incomplete partition.

Therefore, there is a need in the art for a way to identify a set of code and/or database tables that can possibly be accessed by a given function in order to support partitioning and other types of analyses that does not suffer from the problems described above.

SUMMARY OF THE INVENTION

Methods, systems, and computer program products consistent with the principles of the invention address this and other needs by analyzing a software system having runtime binding.

In accordance with an aspect of the invention, a computer program product and computer-implemented system include an entry point identification module for identifying an entry point of the software system, a simulation module for simulating runtime binding in the software system from the entry point, and an analysis module for analyzing results of the simulated runtime binding to identify portions of the software system that are potentially invoked from the entry point.

In accordance with a further aspect of the invention, a method includes identifying an entry point of the software system, and creating two or more nodes, one or more edges connecting the nodes, and one or more entries associated with the nodes in a graph data structure, a node representing a class in the software system that is potentially instantiated if the software system is executed from the entry point, an edge representing a relationship between the classes represented by the connected nodes, and an entry identifying a function within the class represented by the associated node that is potentially invoked if the software system is executed from the entry point. The method further includes examining the graph data structure to identify classes that are potentially instantiated and functions that are potentially invoked when the software system is executed from the entry point.

BRIEF DESCRIPTION OF THE DRAWINGS

FIGS. 4A-4H illustrate various stages of the tracker graph as it is built by the analysis tool when analyzing sample code using algorithm M described by FIG. 3 according to one embodiment.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
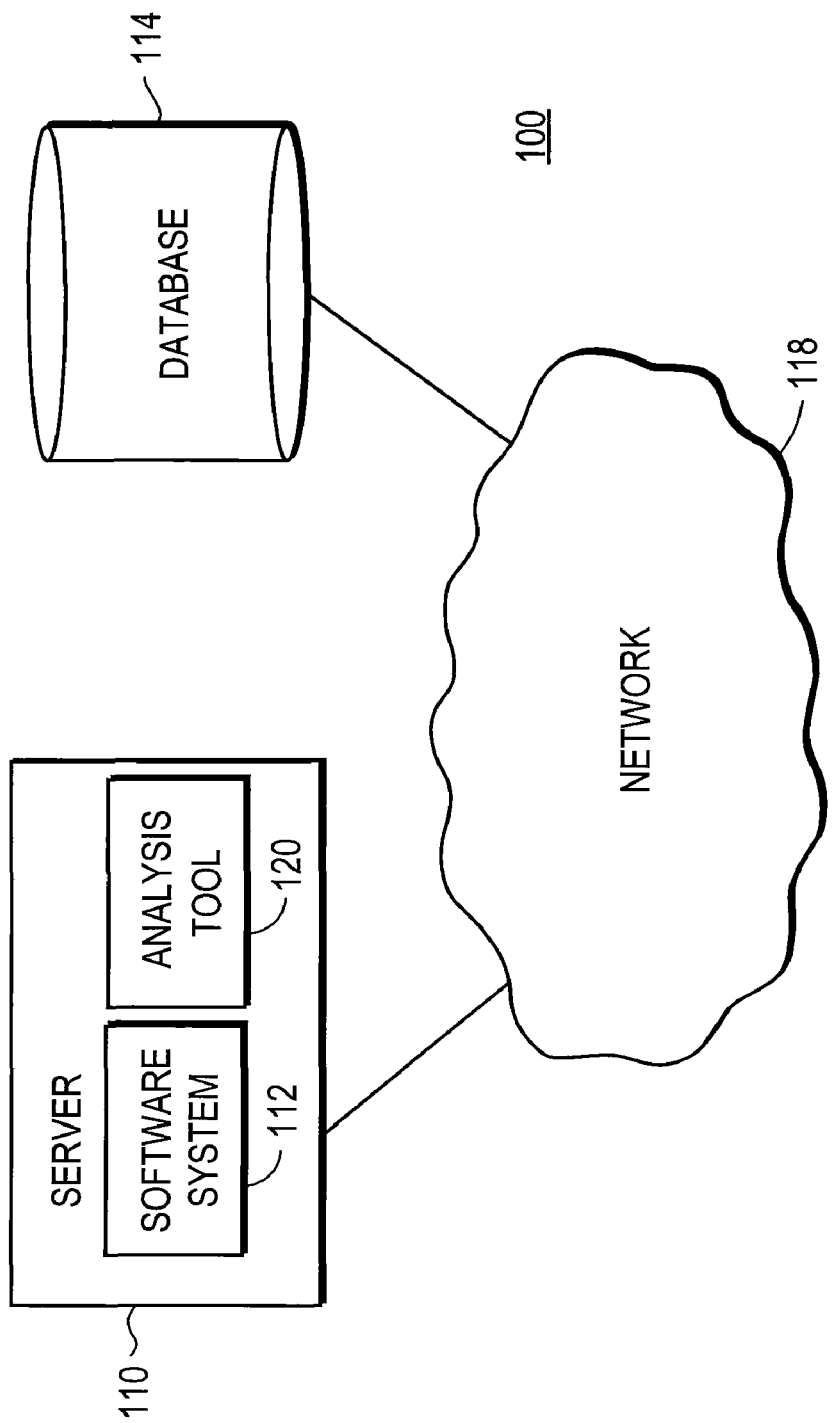
FIG. 1 is a high-level block diagram illustrating an environment having a server executing a software system according to one embodiment.

FIG. 1 is a high-level block diagram illustrating an environment 100 having a server 110 executing a software system 112 according to one embodiment. The software system 112 accesses a database 114. A network 118 provides communications among the server 110 and database 114. In some embodiments, additional servers or databases, and/or other entities such as clients are coupled to the network 118.

The server 110 includes one or more computers for executing the software system 112. For example, the server 110 can be a standard desktop computer system executing the software system 112, or multiple blade servers working together to execute the software system in a parallel and/or distributed manner. In one embodiment, the database 114 is a relational database having tables with rows and columns that are accessed by the software system 112. As with the server 110, the database 114 includes one or more computers for maintaining and controlling access to it. In one embodiment, the server 110 and database 114 collectively provide a website such as an electronic commerce (ecommerce) site having high-availability requirements.

In one embodiment, the software system 112 includes executable code developing using an object-oriented programming language such as JAVA® or C++ that has objects and functions (also called "methods"). In one embodiment, the software system 112 itself is represented as JAVA® byte code. A JAVA® virtual machine compiles the byte code into native code for the computer system at runtime. In one embodiment, the software system 112 uses runtime (late) binding. In runtime binding, an identifier such as a function (and method) name is not bound to a value (e.g., the actual function) until the code is executed. Thus, the particular function invoked on an object is not necessarily known until the code itself is executed.

Further, in one embodiment the software system 112 uses an object-relational mapping with the database 114. In this type of mapping, each object and/or function in the software system 112 is associated with a particular table or tables in the database 114. Thus, if one knows the particular classes/functions invoked during runtime, one can also determine the database tables that were accessed or potentially accessed during runtime.

In one embodiment, the server 110 executes an analysis tool 120 that a developer uses to analyze the software system 112. The analysis tool 120 simulates runtime binding of the software system 112 in order to identify function-level code dependencies. Thus, the tool 120 is useful for partitioning the functions of the software system 112 into core and non-core functions. The non-core functions can then be disabled and updated, while the core functions are left active in order to provide highly-available services. The tool 120 is also useful in other situations where it is necessary or desired to identify function-level code dependencies.

As mentioned above, the server 110 and database 114 include computer systems in some embodiments. Those of skill in the art will recognize that the computer systems include conventional computing hardware including one or more processors and memories for executing and storing code and data. The code and/or data used by the computer system may be organized into one or more computer program modules. As used herein, the term "module" refers to computer program logic and/or data for providing the specified functionality. A module can be implemented in hardware, firmware, and/or software. In one embodiment, the modules are stored on a storage device such as a hard drive, loaded into a memory, and executed by a processor.

Those of skill in the art will also recognize that FIG. 1 represents only one possible embodiment of the environment 100 and software system 112. Other embodiments have a client/server relationship, do not include a database 114 and/or network 118, and/or have other differences from the illustrated environment 100. Further, the software system 112 and analysis tool 120 need not operate on the same computer system, and the database 114 need not be remote from the server 110. The analysis tool 120 can also be integrated into an operating system or other tool set that provides functions in addition to the ones attributed to the analysis tool. Likewise, the software system 112 is not a highly-available system in some embodiments.

The network 118 represents communication pathways between the server 110 and database 114. The network 118 can utilize dedicated or private communications links, and/or public links that travel over the Internet. In one embodiment, the network 118 uses standard communications technologies, protocols, and/or interprocess communications techniques. Thus, the network 118 can include links using technologies such as Ethernet and 802.11 Similarly, the networking protocols used on the network 118 can include the transmission control protocol/Internet protocol (TCP/IP) and the hypertext transport protocol (HTTP). The data exchanged over the network 118 can be represented using technologies and/or formats including the hypertext markup language (HTML), the extensible markup language (XML), etc. In another embodiment, the network 118 can use custom and/or dedicated data communications technologies instead of, or in addition to, the ones described above.

Figure 2:
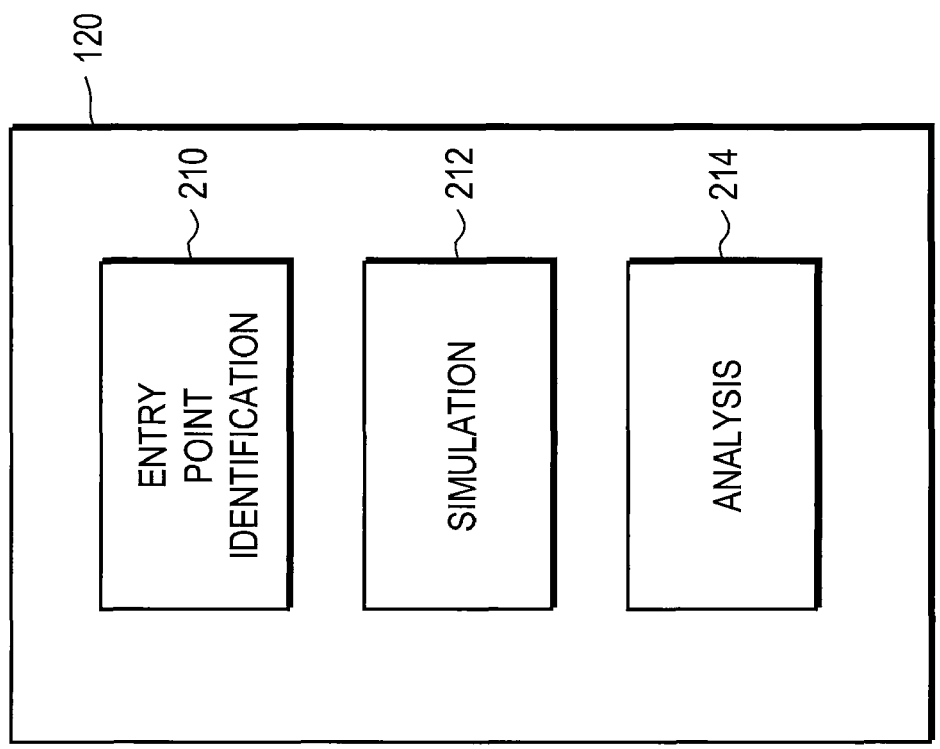
FIG. 2 is a block diagram illustrating modules within the analysis tool according to one embodiment.

FIG. 2 is a block diagram illustrating modules within the analysis tool 120 according to one embodiment. Those of skill in the art will recognize that some embodiments of the analysis tool 120 have additional and/or different modules than the ones described herein. Moreover, the functionalities can be distributed among the modules in a different manner.

An entry point identification module 210 identifies the one or more entry points in the software system 112 at which to start the runtime binding simulation. In one embodiment, the entry point is identified by a fully-specified path to the function to be invoked. For example, in the web development context, an entry point is identified by a path and name such as "www.sample.com/web/software_system/Main_entry_point.class." In one embodiment, the entry point identification module 210 receives an entry point specified by the developer and searches for it within the software system 112. The searching is performed, for example, by generating a regular expression corresponding to the specified entry point and searching the JAVA® byte code for a pattern that satisfies the expression.

A simulation module 212 simulates runtime binding by analyzing the software system 112 to identify classes that are loaded and functions that are invoked from the specified entry point or points. In one embodiment, the simulation module 212 uses a graph data structure referred to herein as a "tracker graph" to track the classes and functions. In one embodiment of the tracker graph, each node, called a "tracker node," represents a loaded class or interface as well as the functions (methods) invoked on the class or interface. If a class or interface represented by a tracker node (node A) is a super class or an interface of a class or interface represented by another tracker node (node B), the tracker graph contains an edge from node A to node B. In one embodiment, the graphing module 212 uses regular expressions to parse byte code in a function body in order to extract functions that are invoked therein. The operation of the simulation module 212 is described in more detail below.

An analysis module 214 analyzes the tracker graph created by the simulation module 212. In one embodiment, the analysis module 214 walks through the tracker graph to identify all of the classes and functions identified therein. These classes and functions are potentially instantiated/invoked if the software system is executed from the specified entry point. In one embodiment, the analysis module 214 generates a report describing the tracker graph. The report can include, for example, an output to a file stored on the computer system executing the analysis tool 120 and/or a presentation on a display associated with the computer system. The developer can review the report to determine which portions of the software system 112 and/or database 114 are used or potentially used by particular entry points. Thus, the developer can use the report to perform tasks such as partitioning the software system 112 and database 114 into core and non-core portions in order to identify portions that can be temporarily disabled for upgrading or other purposes.

Figure 3A:
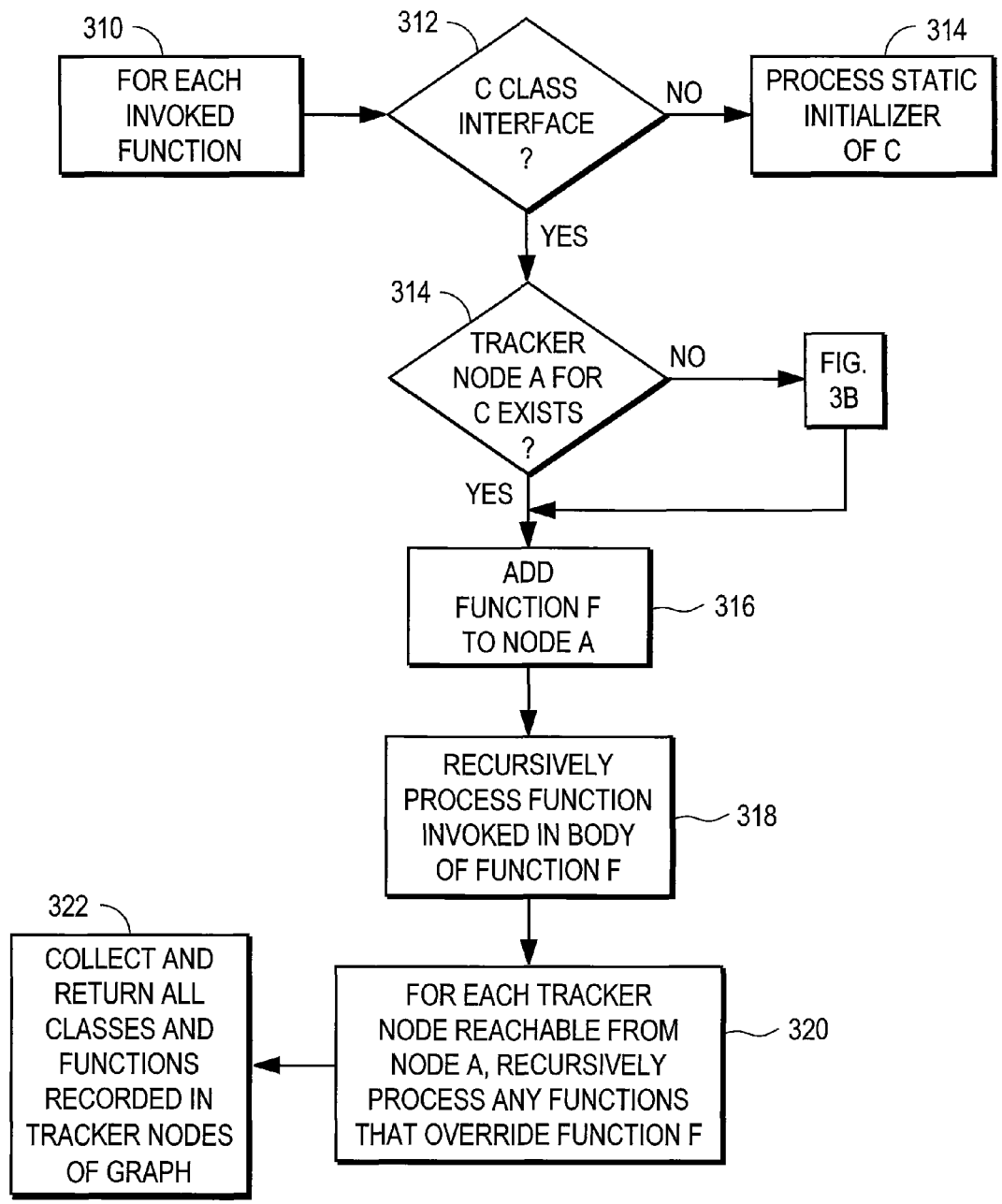
FIGS. 3A and 3B are flowcharts illustrating steps performed by the analysis tool to build and analyze a tracker graph for a software system using an algorithm (M) according to one embodiment.
Figure 3B:
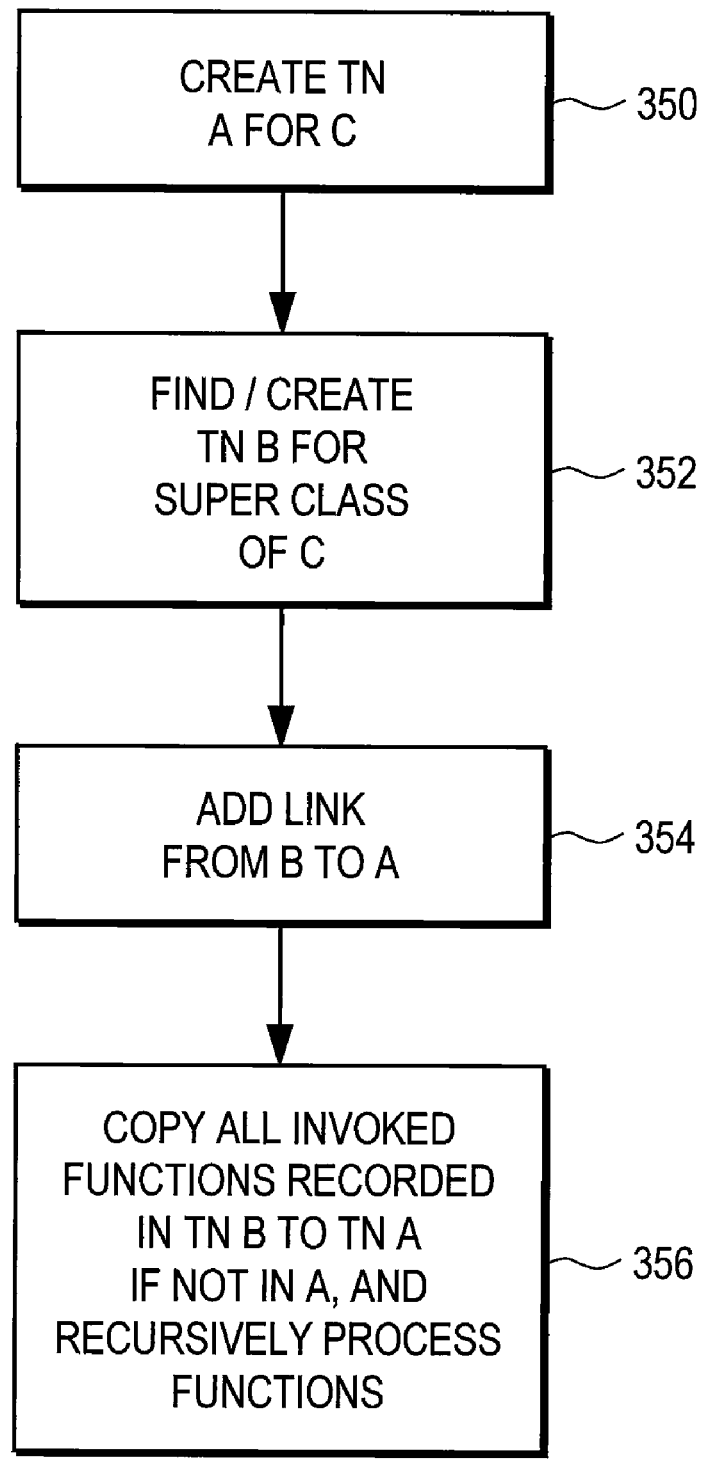

FIGS. 3A and 3B are flowcharts illustrating steps performed by the analysis tool 120 to build and analyze a tracker graph for a software system 112 using an algorithm (M) according to one embodiment. Those of skill in the art will recognize that other embodiments can perform the steps in different orders. Likewise, some embodiments include additional and/or different steps than the ones described herein.

In a typical embodiment, the developer specifies an entry point in the software system 112 and the tool 120 locates the entry point in the system's byte code. An embodiment of the tool 120 performs algorithm M for each function invoked from the entry point. The process of identifying the entry point and each function invoked from the entry point are not explicitly shown in these figures for purposes of clarity. Rather, the figures illustrate algorithm M starting at the point where a function invoked at the entry point is identified.

For 310 the function invoked at the entry point, the tool 120 finds the declared function (F) and its declaring class (C) in the byte code. The tool 120 determines whether function F has already been processed using algorithm M. If function F has been processed, the tool 120 exits processing of function F (and proceeds to the next function invocation if one exists).

If 312 class C is not an interface, the tool processes 314 the static initializer of class C by recursively applying algorithm M to any functions invoked by the initializer. If 312 class C is an interface, the tool 120 marks function F as processed. The tool 120 then determines 314 whether the tracker graph includes a node that represents class C.

Assume for purposes of this example that the tracker graph is initially empty. Thus, the tool creates a tracker node "A" for class C.

The tool 120 then finds 352 the tracker node (node B) that represents class C's super class. If the tracker graph does not contain a node that represents the super class, the tool 120 creates 352 the node in the graph and recursively creates the nodes of any further super classes. The tool additionally creates 354 a link (i.e., a directed edge in the graph) from node B to node A. The tool 120 copies 356 all invoked functions recorded in node B to node A, if the functions are not already in node A. Further, the tool 120 recursively processes 356 each of the copied functions using algorithm M.

Returning now to FIG. 3A, the tool 120 adds 316 function F to node A. In addition, the tool 120 recursively processes 318 any functions invoked by function F using algorithm M. Further, the tool 120 analyzes the tracker graph to identify any tracker nodes that are reachable from node A, and uses algorithm M to recursively process 320 any functions in the classes represented by those nodes that override function F.

Once all of the classes and functions are processed, the tool 120 walks the tracker graph to collect 322 (i.e., identify) all of the classes and functions recorded in the tracker nodes. Thus, these collected classes and functions represent all of the classes that can be instantiated and functions that can be invoked in the software system 112 from the specified entry point. Further, in an embodiment that uses object-relational mapping to associate classes and functions with tables in a database 114, and/or maintains other mappings between classes, functions, and database tables, the collected classes and functions describe the database tables that are potentially accessed by the software system 112 when executed from the entry point. Accordingly, the developer can use the output reported by the tool 120 to partition the software system 112 and/or database 114 into core and non-core functionalities and/or for other purposes.

FIGS. 4A-4H illustrate various stages of the tracker graph as it is built by the analysis tool 120 when analyzing sample code using algorithm M described by FIG. 3 according to one embodiment. Those of skill in the art will recognize that the illustrated tracker graph is merely a visual depiction of a corresponding data structure, and that there are many different ways to represent the graph and structure the data.

For purposes of FIG. 4, assume that the analysis tool is analyzing the following sample JAVA® program:

class Parent {
Parent( ) {foo( )}
void foo( ){ }
class Child1 extends Parent {
Child1( ){ }
void foo( ) {child1 foo}
}
class Child2 extends Parent {
Child2( ) { }
void foo( ) {child2 foo}
}
Parent a=new Child1( );
Parent b=new Child2( );

In this sample program, a super class "Parent" has a constructor that invokes the abstract function "foo( )." There are two subclasses of Parent, "Child1" and "Child2." Each subclass includes a different instance of function "foo( )" that overrides the "foo( )" function declared in Parent. The "Parent a=new Child1( )" and "Parent b=new Child2( )" statements are combined declarations and initializations of instances of Parent objects based on the Child1 and Child2 classes, respectively. During runtime, these statements respectively invoke the Child1 and Child2 versions of the foo( ) function. Those of skill in the art will recognize that this program merely serves to illustrate the operation of the analysis tool 120. In real-world embodiments, the software system 112 and/or other software will be more complex but the tool 120 uses the same techniques described herein to perform its analysis.

In the context of the sample code described above, FIG. 4A starts at the point where the statement "Parent a=new Child1( )" is processed. The tool 120 determines that a tracker node does not yet exist for the Child1 class and creates a Child1 node 412 for it. In addition, the tool 120 identifies the Parent super class of Child1 and creates a Parent node 410 for it. In addition, the tool 120 adds a link 414 from the Parent node 410 to the Child1 node 412.

Figure 4C:
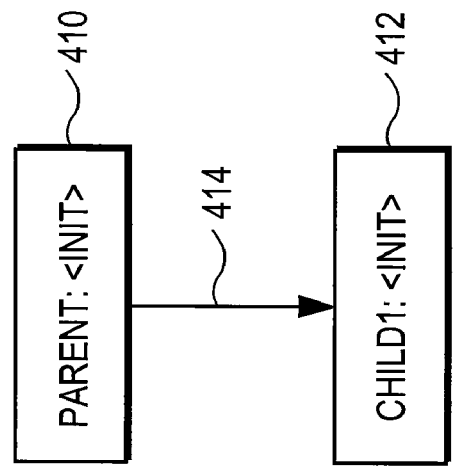
Figure 4B:
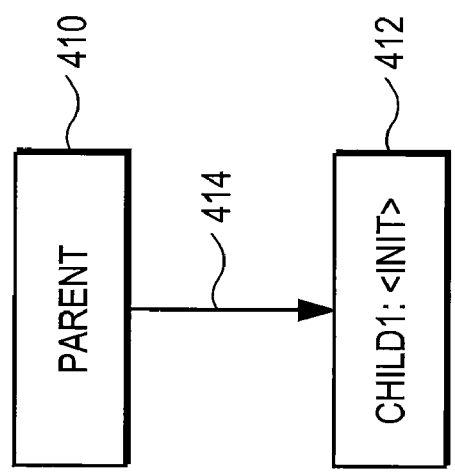
Figure 4A:
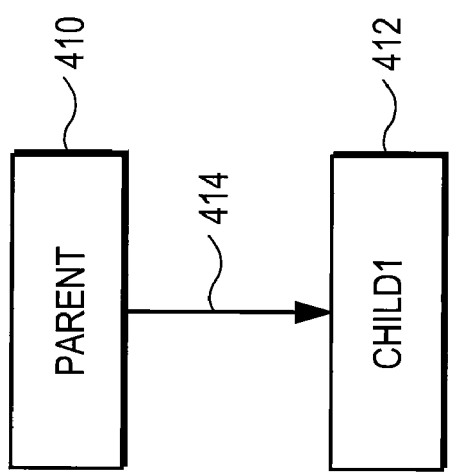

The tool 120 adds an entry for the constructor function for Child1 to the Child1 tracker node 412. This constructor is denoted as "<init>" and is shown in FIG. 4B. The tool 120 processes the function body of Child1.<init> and, during this processing, processes the Parent class constructor function, Parent.<init>. Accordingly, the tool 120 adds an entry for the function Parent.<init> to the Parent tracker node 410 as shown in FIG. 4C.

Figure 4E:
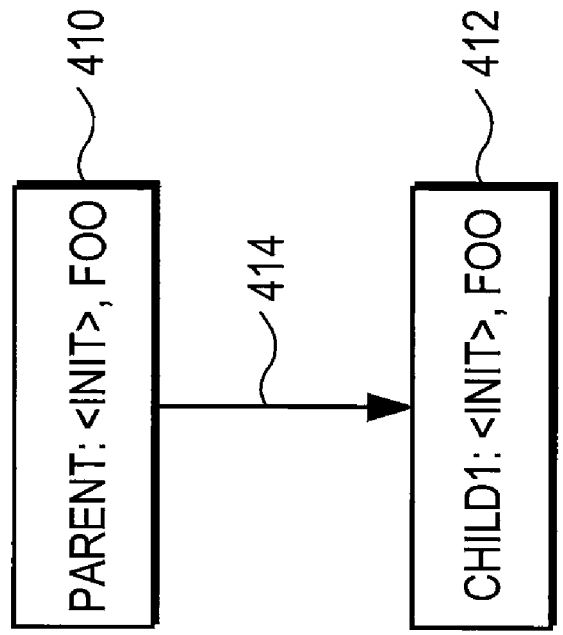
Figure 4D:
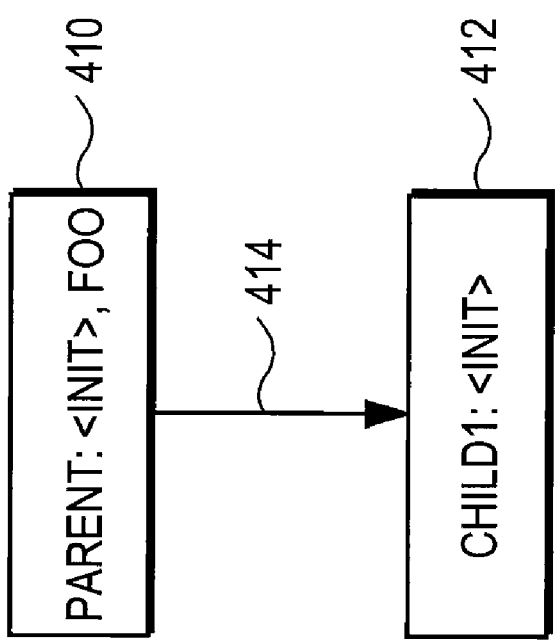

As shown in the sample code above, the function Parent.<init> invokes the foo( ) function, referenced as "Parent.foo." Accordingly, the tool 120 adds and entry for the foo( ) function to the parent as shown in FIG. 4D. The tracker node 412 for Child1 is reachable from the tracker node 410 for Parent, and Child1 includes a foo( ) function that overrides the same-named function in the parent. Therefore, the tool 120 processes the Child1.foo function and adds an entry for this function to the Child1 node 412 as shown in FIG. 4E.

Next, the tool 120 processes the statement "Parent b=new Child2( )" The tool 120 determines that a tracker node does not yet exist for the Child2 class and creates a Child2 node 416 for it. In addition, the tool 120 finds the node 410 for the Parent super class of Child2 and adds a link 418 from the Parent node to the Child2 node 416. FIG. 4F shows the Child2 node 416 and the link 418 from the Parent node 410.

The tool 120 adds an entry for the constructor function "<init>" for Child2 to the Child2 tracker node 416 as shown in FIG. 4G. The tool 120 determines that the Parent.<init> and Parent.foo functions are marked as having already been processed, and the tool does not reprocess them. However, the tracker node 416 for Child2 is reachable from the tracker node 410 for Parent, and Child2 includes a foo( ) function that overrides the same-named function in Parent. Therefore, the tool 120 processes the Child2.foo function and adds an entry for this function to the Child2 node 416 as shown in FIG. 4H. The final tracker graph shown in FIG. 4H thus identifies all of the classes that can be instantiated and functions that can be invoked in the software system from the entry point.

The tool 120 analyzes a software system 112 such that if a class is instantiated, all functions that are invoked on the class itself or on its super classes/interfaces are processed. Further, if a function is invoked on a class, all functions that are defined in the classes' subclasses, which are instantiated, are processed. The tool 120 avoids unnecessarily reprocessing functions that have already been processed, which improves performance and avoids processing cycles where a function invokes itself. In addition, static class initializers are processed because these initializers are explicitly invoked when a class loader loads a class. The tool 120, moreover, handles both interfaces and abstract classes and treats static functions and non-static functions differently since static functions do not have runtime binding. Of course, the tool's analysis is restricted to only the relevant code base.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed:

1. A computer program product having a non-transitory computer-readable storage medium having executable computer program instructions embodied therein for analyzing a software system having runtime binding and configured to access a relational database during execution of the software system, comprising:
    an entry point identification module for identifying an entry point for execution of the software system by searching byte code of the software system for a pattern found at the entry point that satisfies a regular expression indicating the pattern;
    a simulation module for simulating runtime binding that occurs if the software system is executed from the entry point by analyzing a data structure to ascertain portions of the software system that can be potentially invoked from the entry point, wherein the portions comprise functions in the software system; and
    an analysis module for analyzing results of the simulated runtime binding to identify portions of the software system that can be invoked if the software system is executed from the entry point and portions of tables of the relational database that can be accessed by the portions of the software system executed from the entry point.

2. The computer program product of claim 1, wherein the simulation module is further adapted to identify classes that can be loaded from the entry point.

3. The computer program product of claim 1, wherein the simulation module is adapted to generate a graph data structure having nodes representing classes that can be instantiated from the entry point and edges between the nodes representing relationships between the classes and the simulation module analyzes the graph data structure.

4. The computer program product of claim 3, wherein the simulation module is further adapted to identify at each node of the graph data structure functions in the software system that are potentially invoked by the class represented by the node.

5. The computer program product of claim 4, wherein the analysis module is adapted to analyze the nodes, edges, and functions in the graph data structure to ascertain the portions of the software system that can be potentially invoked from the entry point.

6. A computer-implemented system for analyzing a software system having runtime binding and configured to access a relational database during execution of the software system, comprising:
    a non-transitory computer-readable storage medium having executable computer program instructions embodied therein comprising:
        an entry point identification module for identifying an entry point for execution of the software system by searching byte code of the software system for a pattern found at the entry point that satisfies a regular expression indicating the pattern;
        a simulation module for simulating runtime binding that occurs if the software system is executed from the entry point by analyzing a data structure to ascertain portions of the software system that can be potentially invoked from the entry point, wherein the portions comprise functions in the software system; and
        an analysis module for analyzing results of the simulated runtime binding to identify portions of the software system that can be invoked if the software system is executed from the entry point and portions of tables of the relational database that can be accessed by the portions of the software system executed from the entry point; and
    a processor for executing the computer program instructions.

7. The system of claim 6, wherein the simulation module is further adapted to identify classes that can be loaded from the entry point.

8. The system of claim 6, wherein the simulation module is adapted to generate a graph data structure having nodes representing classes that can be instantiated from the entry point and edges between the nodes representing relationships between the classes and the simulation module analyzes the graph data structure.

9. The system of claim 8, wherein the simulation module is further adapted to identify at each node of the graph data structure functions in the software system that can be invoked by the class represented by the node.

10. The system of claim 9, wherein the analysis module is adapted to analyze the nodes, edges, and functions in the graph data structure to ascertain the portions of the software system that can be invoked from the entry point.

11. A method of analyzing a software system developed using object-oriented programming, configured to access a relational database during execution of the software system and having runtime binding, comprising:
- identifying an entry point for execution of the software system specified by searching byte code of the software system for a pattern found at the entry point that satisfies a regular expression indicating the pattern;
- creating two or more nodes, one or more edges connecting the nodes, and one or more entries associated with the nodes in a graph data structure, a node representing a class in the software system that can be instantiated if the software system is executed from the entry point, an edge representing a relationship between the classes represented by the connected nodes, and an entry identifying a function within the class represented by the associated node that can be potentially invoked if the software system is executed from the entry point; and
- examining the graph data structure to identify classes that can be instantiated, functions that can be invoked and portions of the relational database that can be accessed by the software system executed from the entry point.

12. The method of claim 11, wherein creating two or more nodes comprises:
- identifying a parent class of a child class that can be instantiated if the software system is executed from the entry point;
- identifying a parent node in the graph data structure representing the parent class;
- creating an edge in the graph data structure, the edge connecting the parent node and a child node representing the child class;
- identifying entries in the parent node identifying functions within the parent class that can be invoked if the software system is executed from the entry point; and
- copying the identified entries from the parent node to the child node.

13. The method of claim 11, wherein creating two or more nodes comprises:
- identifying a function F invoked when a class C is instantiated;
- creating an entry for function F in a node N representing class C in the graph data structure;
- recursively analyzing the function F to identify other classes that can be instantiated and functions that can be invoked if function F is invoked; and
- adding to the graph data structure nodes, edges, and entries representing the other classes that can be instantiated and functions that can be invoked if function F is invoked.

14. The method of claim 11, wherein the edges of the graph data structure are directed and wherein creating two or more nodes comprises:
- analyzing the graph data structure to identify any nodes that are reachable via a directed edge from a node N having a function F;
- for each node that is reachable via a directed edge from node N, identifying an entry representing a function in the reachable node that overrides function F;
- recursively analyzing the function that overrides function F to identify other classes that can be instantiated and functions that can be invoked if the function that overrides function F is invoked; and
- adding to the graph data structure nodes, edges, and entries representing the other classes that can be instantiated and functions that can be invoked if the function that overrides function F is invoked.

15. The method of claim 11, further comprising:
- determining whether a class that can be potentially instantiated if the software system is executed from the entry point is an interface;
- responsive to a determination that the class is not an interface, analyzing a static initializer of the class to identify any functions that can be invoked by the static initializer.

* * * * *